(No Model.)
H. AGAN.
CULTIVATOR TOOTH.
No. 412,445. Patented Oct. 8, 1889.
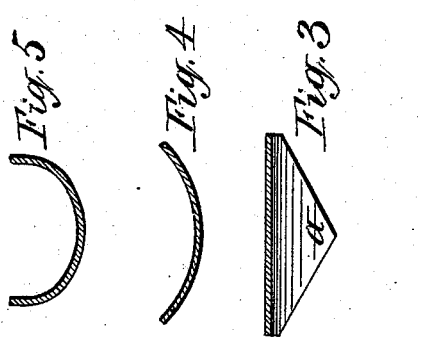
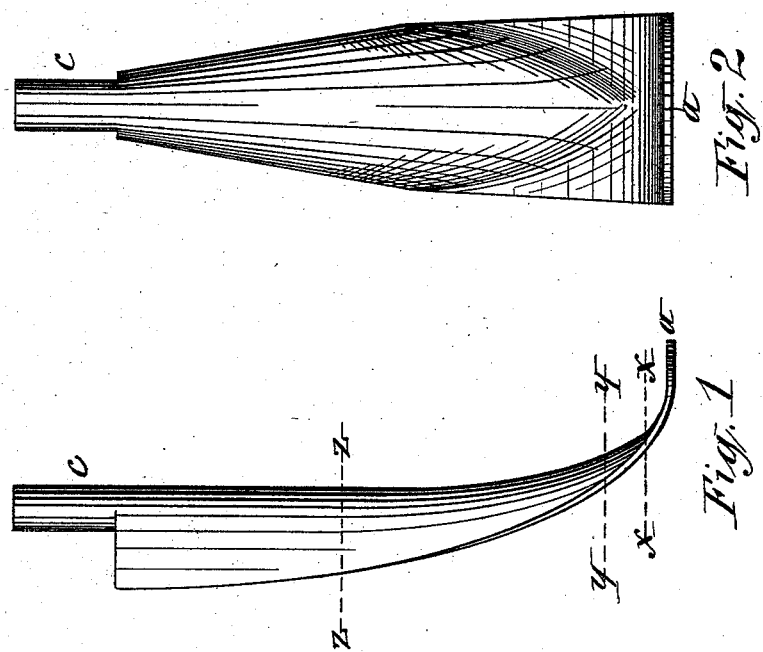
WITNESSES:
C. L. Bendixon
J. J. Laass.
INVENTOR:
Hiram Agan
BY
Dull, Laass & Dull
his ATTORNEYS

UNITED STATES PATENT OFFICE.

HIRAM AGAN, OF ROME, NEW YORK, ASSIGNOR OF ONE-HALF TO ALFRED ETHRIDGE, OF SAME PLACE.

CULTIVATOR-TOOTH.

SPECIFICATION forming part of Letters Patent No. 412,445, dated October 8, 1889.

Application filed June 12, 1889. Serial No. 313,993. (No model.)

*To all whom it may concern:*

Be it known that I, HIRAM AGAN, of Rome, in the county of Oneida, in the State of New York, have invented new and useful Improvements in Cultivator-Teeth, of which the following, taken in connection with the accompanying drawings, is a full, clear, and exact description.

This invention consists in a novel construction of a cultivator or harrow tooth formed with a straight face across the point thereof, which, in the operation of the tooth, cuts with the entire width of the point horizontally under the surface of the ground, so as to cut the roots of all plants a uniform distance under the ground, and in raising and casting the earth to opposite sides of the tooth the blunt front thereof breaks up said earth and pulverizes the same more thoroughly than the usual V-shaped front of ordinary cultivator and harrow teeth.

The invention is fully illustrated in the annexed drawings, in which—

Figure 1 is a side view of a cultivator or harrow tooth embodying my invention. Fig. 2 is a front view of the same; and Figs. 3, 4, and 5 are transverse sections, respectively, on lines *x x*, *y y*, and *z z*, Fig. 1.

My improved cultivator or harrow tooth and its attaching shank or standard are preferably formed in one piece of sheet-steel and with a V-shaped point *a*. This point and the portion immediately back of it are perfectly flat transversely, so as to present a broad horizontal front or face across said portions of the tooth. The tooth is curved sharply upward from the point-section to a practically-vertical main portion, which latter begins slightly convex and increases in convexity to the top of the tooth or blade, as illustrated in Figs. 4 and 5 of the drawings.

My described cultivator or harrow tooth is more particularly designed for use on the western prairie lands, where the soil is heavy and sticky.

My improved tooth passes horizontally under the ground and cuts ahead, so as to cause the soil to slide horizontally over the top of the point, and then to be turned over at opposite sides of the point by the convex portion of the tooth. In this manner the point of the tooth is scoured by the soil and thus prevented from being clogged.

Having described my invention, what I claim as new, and desire to secure by Letters Patent, is—

The improved cultivator or harrow tooth formed integral with the shank, and having a horizontal V-shaped point-section curving sharply upward to a practically-vertical main portion, said main portion beginning slightly convex and increasing in convexity to the top of the tooth or blade, substantially as shown and described.

In testimony whereof I have hereunto signed my name this 6th day of June, 1889.

HIRAM AGAN. [L. S.]

Witnesses:
C. H. DUELL,
J. J. LAASS.